(12) United States Patent
Asada

(10) Patent No.: US 10,067,724 B2
(45) Date of Patent: Sep. 4, 2018

(54) IMAGE FORMING APPARATUS WITH SELECTABLE SERVICE CONFIGURATION, IMAGE FORMING SYSTEM INCLUDING SAME, AND METHOD FOR SELECTIVE IMAGE FORMATION

(71) Applicant: Oki Data Corporation, Tokyo (JP)

(72) Inventor: Hiroshi Asada, Tokyo (JP)

(73) Assignee: Oki Data Corporation, Tokyo (JP)

( * ) Notice: Subject to any disclaimer, the term of this patent is extended or adjusted under 35 U.S.C. 154(b) by 96 days.

(21) Appl. No.: 14/479,694

(22) Filed: Sep. 8, 2014

(65) Prior Publication Data
US 2015/0070727 A1    Mar. 12, 2015

(30) Foreign Application Priority Data
Sep. 10, 2013 (JP) .................................. 2013-187437

(51) Int. Cl.
*G06F 3/12* (2006.01)

(52) U.S. Cl.
CPC ............ *G06F 3/126* (2013.01); *G06F 3/1203* (2013.01); *G06F 3/1236* (2013.01); *G06F 3/1267* (2013.01); *G06F 3/1287* (2013.01); *G06F 3/1288* (2013.01)

(58) Field of Classification Search
CPC .... G06F 3/1288; G06F 3/1238; G06F 3/1204; G06F 3/1259; G06F 3/1268; G06F 21/604; G06F 3/1267; G06F 3/1285; G06F 3/1287; G06F 3/1289; G06F 3/129; G06F 3/1229; G06F 3/1232; G06F 3/1236; G06F 3/126; G06F 3/1265; G06F 3/1237; G06F 3/1203; H04N 1/00244; H04N 1/00204; H04N 2201/0072; H04N 2201/007; H04N 2201/0015; G06K 15/4045; G06K 15/1821
USPC .............................................. 358/1.13, 1.15
See application file for complete search history.

(56) References Cited

U.S. PATENT DOCUMENTS

| | | | | |
|---|---|---|---|---|
| 8,599,402 B2 * | 12/2013 | Iwasaki | ................. | G06F 3/1204 358/1.14 |
| 8,760,697 B2 * | 6/2014 | Maekawa | ............. | G06F 3/1205 358/1.14 |
| 9,019,536 B2 * | 4/2015 | Ohno | .................... | G06F 3/1296 358/1.14 |
| 9,092,703 B2 * | 7/2015 | Kamoi | .................. | G06K 15/02 |

(Continued)

FOREIGN PATENT DOCUMENTS

JP    2008-146465 A    6/2008

*Primary Examiner* — Moustapha Diaby
(74) *Attorney, Agent, or Firm* — Muncy, Geissler, Olds & Lowe, P.C.

(57) ABSTRACT

An image forming apparatus includes a print job addition notification reception controller that receives from outside a print job addition notification that indicates a print job is added to a server, a print job reception controller that acquires the print job from the server, a print controller that performs printing based on the print job acquired from the server, and a service state controller that sets a service state to be any one of a service enabled state, in which the print job addition notification is received and the print job is acquired from the server, and a service stopped state, in which the print job addition notification is not received and the print job is acquired from the server based on an operation of a user.

20 Claims, 13 Drawing Sheets

(56) References Cited

U.S. PATENT DOCUMENTS

| | | | | |
|---|---|---|---|---|
| 2012/0194864 A1* | 8/2012 | Oshima | ............... | G06F 3/1204 |
| | | | | 358/1.15 |
| 2012/0236359 A1* | 9/2012 | Mihara | ............... | G06F 3/1205 |
| | | | | 358/1.15 |
| 2013/0120794 A1* | 5/2013 | Kamoi | ................. | G06K 15/02 |
| | | | | 358/1.15 |
| 2013/0188221 A1* | 7/2013 | Ohno | ................... | G06F 3/1296 |
| | | | | 358/1.15 |
| 2014/0268230 A1* | 9/2014 | Kosuda | ............... | G06F 3/1263 |
| | | | | 358/1.15 |
| 2015/0124282 A1* | 5/2015 | Minagawa | .......... | G06F 3/1222 |
| | | | | 358/1.15 |

\* cited by examiner

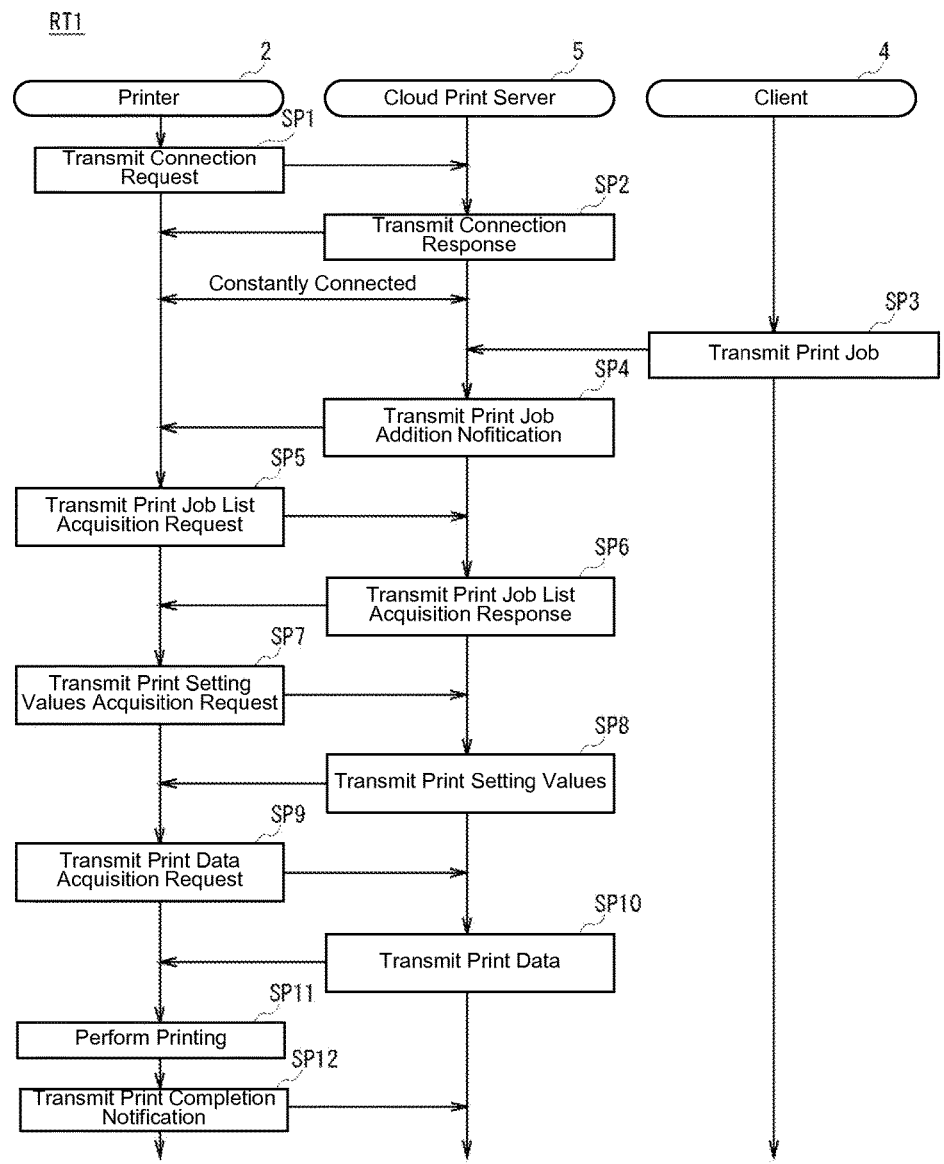

Fig. 7

JL : Print Job List

```
{
"Job ID": "12345"
"File Name": "test1.pdf",
"Status": "Waiting",
"Print Data Storage Destination": http://printing/download?xyzxyz',
"Print Setting Values Storage Destination": http://printing/output?xxxyyyzzz',
}
{
"Job ID": "6789",
"File Name": "test2.pdf",
"Status": "Waiting",
"Print Data Storage Destination": http://printing/download?abcabc',
"Print Setting Values Storage Destination": http://printing/output?aaabbbccc',
}
```

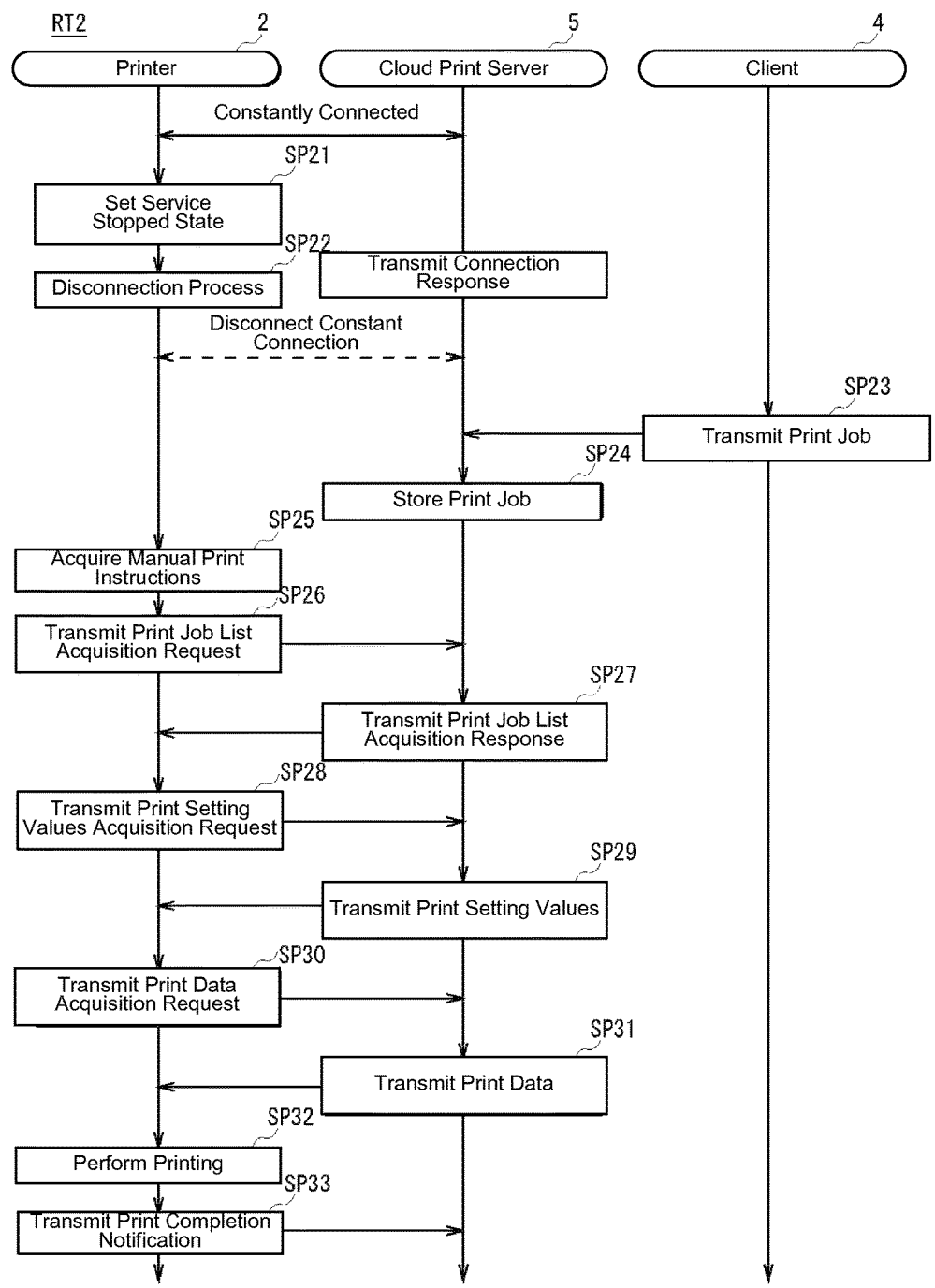

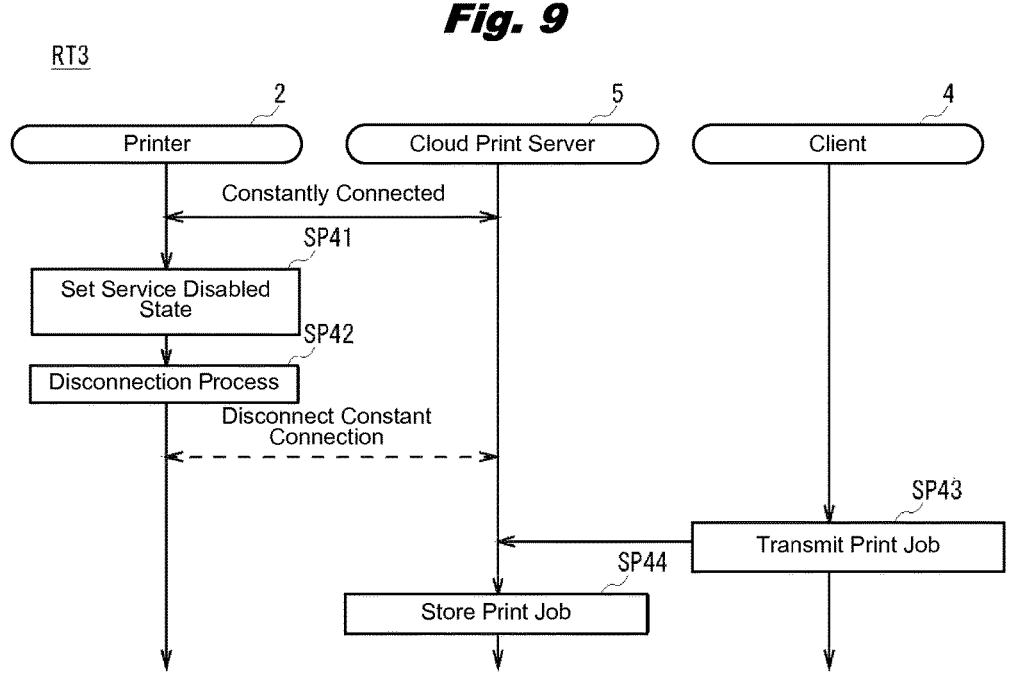

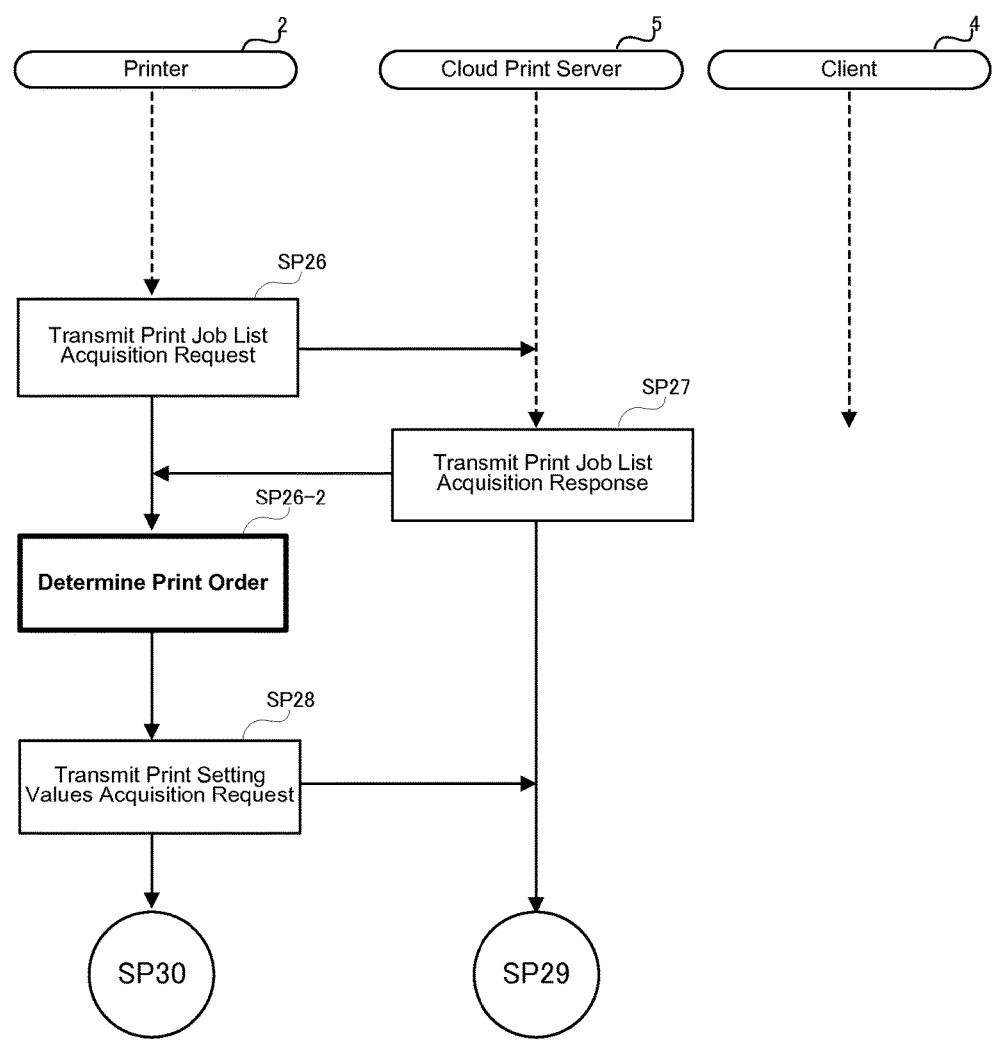

Fig. 13

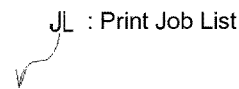

```
{
"Job ID": "12345"
"File Name": "test1.pdf",
"Status": "waiting",
"Print Data Storage Destination": http://printing/download?xyzxyz',
"Print Setting Values Storage Destination": http://printing/output?xxxyyyzzz',
"Creation Time": "123456789",
"Update Time" : "123459876",
"Printer Name": "MFP",
"Owner ID": "aaa@xxx.com",
"Tag": "documents"
}
{
"Job ID": "6789",
"File Name": "test2.pdf",
"Status": "Waiting",
"Print Data Storage Destination": http://printing/download?abcabc',
"Print Setting Values Storage Destination": http://printing/output?aaabbbccc',
"Creation Time": "213456789",
"Update Time" : "213459876",
"Printer Name": "MFP",
"Owner ID": "bbb@xxx.com",
"Tag": "documents"
}
```

IMAGE FORMING APPARATUS WITH SELECTABLE SERVICE CONFIGURATION, IMAGE FORMING SYSTEM INCLUDING SAME, AND METHOD FOR SELECTIVE IMAGE FORMATION

CROSS REFERENCE

The present application is related to, claims priority from and incorporates by reference Japanese Patent Application No. 2013-187437, filed on Sep. 10, 2013.

TECHNICAL FIELD

The present invention relates to an image forming apparatus and an image forming system, and can be suitably applied to a cloud print system in which, for example, a print job that is transmitted from a client to a server is transmitted from the server to a printer and the printer is caused to perform printing.

BACKGROUND

Conventionally, an image forming system has been proposed in which a print job is transmitted from a client via the Internet to a server and, by transmitting the print job from the server via the Internet to a printer, printing is performed using the printer based on the print job (for example, see Japanese Patent Laid-Open Publication No. 2008-146465).

In such an image forming system, there may be a case where, when a printer receives a print job addition notification that is transmitted from a server that has received a print job from a client, in response to the print job addition notification, the printer acquires the print job from the server.

In such an image forming system, some improvements are expected. For example, when a client terminal is far from a printer connected to the internet, there is time difference between when the user executes a print operation and when the user picks the prints up at the printer side. Thereby, in case many users use that printer, there are many prints and possibilities that those prints could be mixed. Convenience for that matter is desired.

The present invention is made by considering the above problem and is intended to propose an image forming apparatus and an image forming system that can improve convenience.

SUMMARY

In order to achieve the improved convenience, an image forming apparatus disclosed in the application includes a print job addition notification reception controller that receives from outside a print job addition notification that indicates a print job is added to a server, a print job reception controller that acquires the print job from the server, a print controller that performs printing based on the print job acquired from the server, and a service state controller that sets a service state to be any one of a service enabled state, in which the print job addition notification is received and the print job is acquired from the server, and a service stopped state, in which the print job addition notification is not received and the print job is acquired from the server based on an operation of a user.

As a result, in the image forming apparatus of the present invention, in a state in which the image forming apparatus is not notified of that a print job has been added to a server, at a desired timing of a user, presence or absence of a print job can be confirmed with the server from the image forming apparatus, and the image forming apparatus can acquire the print job and perform printing.

In a specific example described in the following, convenience of a user is improved.

BRIEF DESCRIPTION OF THE DRAWINGS

FIG. 6 illustrates a sequence chart illustrating print process procedures of a service enabled state.

FIG. 7 illustrates a print job list.

FIG. 8 illustrates a sequence chart illustrating print process procedures of a service stopped state.

FIG. 9 illustrates a sequence chart illustrating print process procedures of a service disabled state.

FIG. 10 illustrates a flow chart illustrating print process procedures of a service stopped state.

FIG. 13 illustrates an example of a job list that is acquired from a cloud print server.

DETAILED DESCRIPTION OF EMBODIMENTS

In the following, a mode for carrying out the invention (hereinafter, this is referred to as an embodiment) is described using the drawings.

1. Embodiment

[1-1. Overall Configuration of Cloud Print System]

Figure 1:
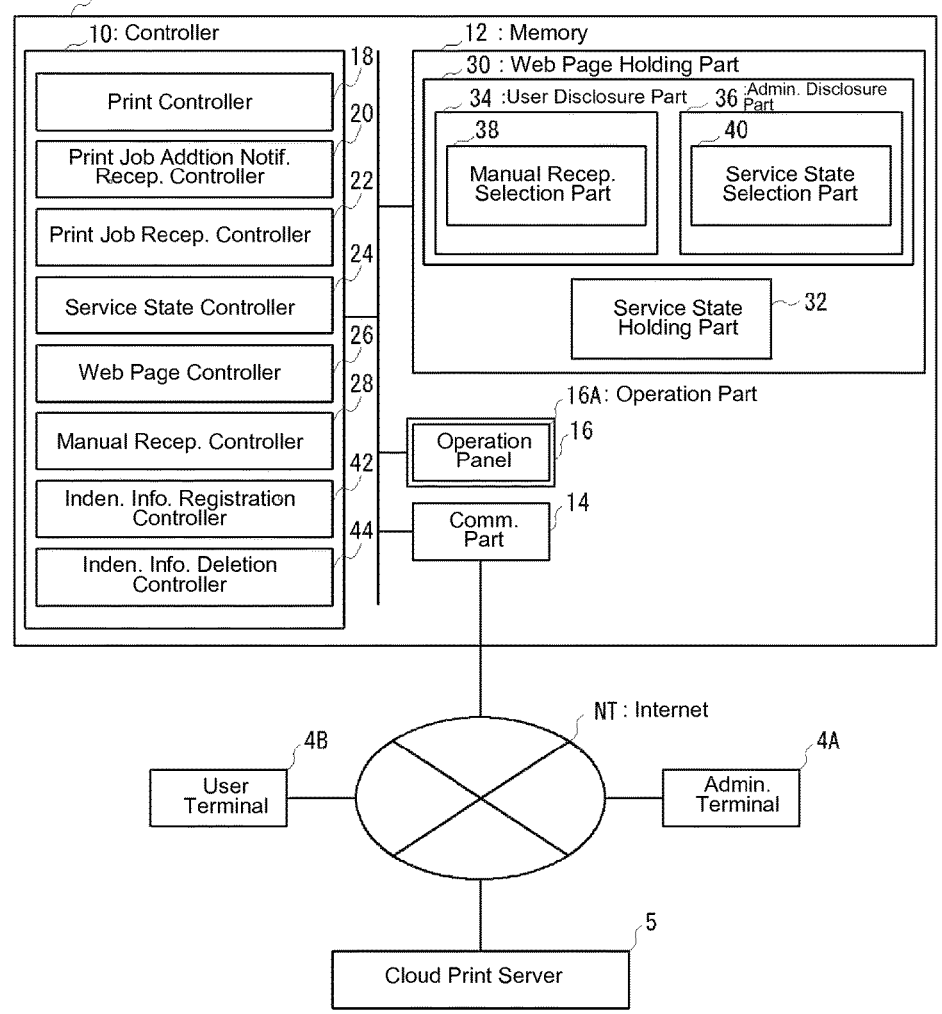
FIG. 1 illustrates a schematic diagram illustrating an overall configuration of a cloud print system.

As illustrated in FIG. 1, in a cloud print system 1, a printer 2, an administrator terminal 4A and a user terminal 4B are connected via the Internet NT to a cloud print server 5.

By registering information indicating the printer 2 that is connected to the cloud print server 5 via the Internet NT with a predetermined memory, the cloud print server 5 is in a state capable of allowing the printer 2 to be specified as a print destination from the administrator terminal 4A and the user terminal 4B via the Internet NT.

The administrator terminal 4A is configured by a PC (personal computer), or a mobile terminal, or the like. The administrator terminal 4A is operated by an administrator who is authorized to administer settings of the printer 2 in cloud print, which is a service that utilizes the cloud print server 5 to perform printing using the printer 2. By accessing the printer 2 via the Internet NT, the administrator terminal 4A configures settings related to operation of the printer 2 in the cloud print system 1, such as a service state (to be described later).

Further, by being operated by the administrator, the administrator terminal 4A transmits a print job to the cloud print server 5 by specifying the printer 2 that has been registered with the cloud print server 5.

The user terminal 4B is configured by a PC, or a mobile terminal, or the like. By being operated by an ordinary user who is not authorized to administer the settings of the printer 2 in cloud print, the user terminal 4B transmits a print job to the cloud print server 5 by specifying the printer 2 that has been registered with the cloud print server 5.

The administrator terminal 4A and the user terminal 4B are configured as clients with respect to the cloud print server 5. In the following, the administrator terminal 4A and the user terminal 4B are also collectively referred to as a client 4. Further, in the following, the ordinary user and the administrator are collectively referred as a user.

When a print job is added from the administrator terminal 4A or the user terminal 4B (that is, the client 4), the cloud print server 5 notifies the printer 2 of a print job addition notification that indicates the print job has been added to the cloud print server 5.

When the printer 2 receives the print job addition notification, the printer 2 receives the print job from the cloud print server 5 and performs printing based on the print job. The printer 2 has a function of capable of selecting either that a print job addition notification is transmitted from the cloud print server 5 or that a print job addition notification is not transmitted from the cloud print server 5, and a function of performing printing by acquiring a print job from the cloud print server 5 based on an operation of a user with respect to the printer 2 (details will be described later).

[1-2. Configuration of Printer]

In the printer 2, a controller 10 controls respective parts (a memory 12, a communication part 14 and an operation part 16). The controller 10 is configured to have a CPU (Central Processing Unit) (not illustrated in the drawings) as a core component and controls the respective parts to perform various processes such as a print process by reading out a predetermined program from the memory 12 (which is formed by a ROM (Read Only Memory), a RAM (Random Access Memory), a hard disk drive, a flash memory and the like) and executing the program.

The communication part 14 performs data transmission to and data reception from the administrator terminal 4A, the user terminal 4B and the cloud print server 5 via the Internet NT.

The operation part 16 has an operation panel 16A and operation keys (not illustrated in the drawings). In the operation panel 16A, an LCD (Liquid Crystal Display) displaying various setting screens and the like based on the control of the controller 10 and a touch panel for inputting selections of various setting items in the setting screens are integrated. The operation keys include a copy screen display key, a print screen display key, a scan screen display key, a facsimile screen display key, a start key, a stop/clear key, a power key, number input keys, and the like. When the operation panel 16A or the operation keys are operated, the operation part 16 outputs an operation instruction to the controller 10.

The memory 12 has a web page holding part 30 and a service state holding part 32. The web page holding part 30 holds source of a web page (hereinafter, this is also referred to as an apparatus web page) in a HTML (HyperText Markup Language) format for displaying various settings related to the printer 2 in predetermined displays of the administrator terminal 4A and the user terminal 4B.

Further, the web page holding part 30 is divided into a user disclosure part 34 and an administrator disclosure part 36, and content of the apparatus web page to be displayed changes in response to an access from the administrator terminal 4A or the user terminal 4B, the administrator terminal 4A and the user terminal 4B having mutually different authorities with respect to the settings of the printer 2.

The user disclosure part 34 is an apparatus web page to be displayed, via the Internet NT, in a browser of a display of the administrator terminal 4A or the user terminal 4B for an access from the administrator terminal 4A or the user terminal 4B, and is configured to be operable by an administrator operating the administrator terminal 4A and an ordinary user operating the user terminal 4B.

The user disclosure part 34 has a manual reception selection part 38. The manual reception selection part 38 is configured to allow selecting, by an operation of a user, manual reception for acquiring a print job from the cloud print server 5 (this will be described in detail later).

The administrator disclosure part 36 is an apparatus web page to be displayed, via the Internet NT, in a browser of a display of the administrator terminal 4A for an access from the administrator terminal 4A, and is configured to be operable by an administrator operating the administrator terminal 4A.

The administrator disclosure part 36 has a service state selection part 40. The service state selection part 40 is configured to allow selection of any one service state of a plurality of service states (to be described later) of the printer 2 in the cloud print system 1.

The service state holding part 32 holds a service state selected in the service state selection part 40. Further, also in a case where a service state is selected by an operation of an administrator with respect to the operation panel 16A, the service state holding part 32 holds the selection of the service state.

The controller 10 has a print controller 18, a print job addition notification reception controller 20, a print job reception controller 22, a service state controller 24, a web page controller 26, a manual reception controller 28, an identification information registration controller 42 and an identification information deletion controller 44.

The print controller 18 prints, on a predetermined sheet, print data that is contained in a print job and is data to be actually printed, the print job being received from the cloud print server 5 via the Internet NT.

The print job addition notification reception controller 20 detects a print job addition notification that is received from the cloud print server 5 via the Internet NT and indicates that a print job is added to the cloud print server 5.

When the print job addition notification reception controller 20 detects a print job addition notification, the print job reception controller 22 acquires the print job from the cloud print server 5. Further, also in a case where an operation instruction of manual reception for acquiring a print job from the cloud print server 5 is made by an operation of a user with respect to the operation panel 16A, the print job reception controller 22 acquires the print job from the cloud print server 5. The print job reception controller 22 causes printing to be performed by providing the received print job to the print controller 18.

The service state controller 24 sets the service state of the printer 2 of the cloud print system 1 in the service state holding part 32 by either an operation of an administrator with respect to the operation panel 16A or an operation of an administrator with respect to the service state selection part 40 via the administrator terminal 4A.

The web page controller 26 acquires an apparatus web page from the web page holding part 30 of the memory 12 and transmits the apparatus web page to the administrator terminal 4A or the user terminal 4B.

When a manual reception instruction is received by an operation of a user with respect to the operation panel 16A, an operation of an administrator with respect to the manual reception selection part 38 via the administrator terminal 4A, or an operation of a user with respect to the manual reception selection part 38 via the user terminal 4B, the manual reception controller 28 acquires a print job from the cloud print server 5 via the Internet NT and causes printing to be performed by transmitting the print job to the print controller 18.

As described above, the printer 2 is configured in such a manner that, when a print job addition notification is received from the cloud print server 5, not only that printing can be automatically performed by acquiring the print job from the cloud print server 5 without the need for a user to perform an operation, but also that printing can be performed by acquiring the print job from the cloud print server 5 by operating the operation panel 16A or the manual reception selection part 38 by a user.

Prior to using the cloud print, the identification information registration controller 42 registers with the cloud print server 5 a printer ID as unique identification information indicating the printer 2 in the cloud print system 1 by transmitting an identification information registration request to the cloud print server 5 based on an operation of a user with respect to the operation panel 16A or an operation of an administrator with respect to the administrator disclosure part 36 via the administrator terminal 4A.

To stop using the cloud print, the identification information deletion controller 44 deletes the printer ID from the cloud print server 5 by transmitting an identification information deletion request to the cloud print server 5 based on an operation of a user with respect to the operation panel 16A or an operation of an administrator with respect to the administrator disclosure part 36 via the administrator terminal 4A.

[1-3. Configuration of Cloud Print Server]

Figure 2:
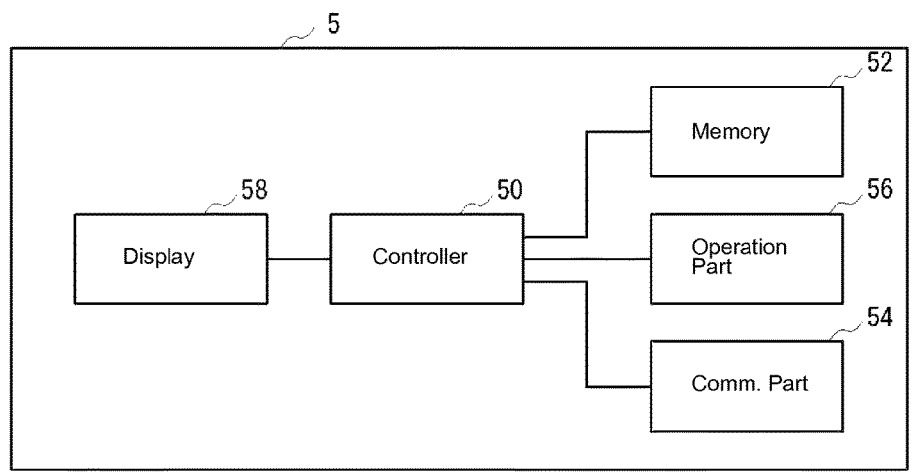
FIG. 2 illustrates a schematic diagram illustrating a configuration of a cloud print server.

As illustrated in FIG. 2, in the cloud print server 5, a controller 50 controls respective parts (a memory 52, an operation part 56, a communication part 54 and a display 58). The controller 50 is configured to have a CPU (not illustrated in the drawings) as a core component and controls the respective parts to perform various processes by reading out a predetermined program from the memory 52 (which is formed by a ROM, a RAM, a hard disk drive, a flash memory and the like) and executing the program.

The communication part 54 performs data transmission to and data reception from the printer 2, the administrator terminal 4A and the user terminal 4B via the Internet NT.

When an identification information registration request is received from the printer 2 via the communication part 54, the controller 50 issues a printer ID and transmits the printer ID to the printer 2 via the communication part 54.

Further, the controller 50 mutually associates the printer ID and an account of an administrator of the printer 2, to which the printer ID is assigned, and registers the printer ID and the account of the administrator in a cloud printer list in the memory 52. In the cloud printer list, printer IDs of printers that can be used in the cloud print system 1 are registered in a manner that only an account of one administrator is associated with one printer ID. An administrator can authorize an ordinary user to use the printer 2 by performing a process of sharing the printer 2 with respect to the ordinary user.

Further, when an identification information deletion request is received via the communication part 54 from the printer 2, the controller 50 deletes the printer ID indicating the printer 2 from the cloud print list.

The memory 52 stores, for each printer that is assigned with a printer ID that is registered in the cloud print list, a print job queue in which print jobs to be printed using the printer are accumulated.

The operation part 56 is configured by, for example, a keyboard and a mouse, and receives an operation instruction from an administrator. The display 58 is configured by, for example, a liquid crystal display, and displays image data output from the controller 50.

[1-4. Configurations of Administrator Terminal and User Terminal]

The administrator terminal 4A and the user terminal 4B are substantially identically configured. Therefore, in the following, only the administrator terminal 4A is described.

Figure 3:
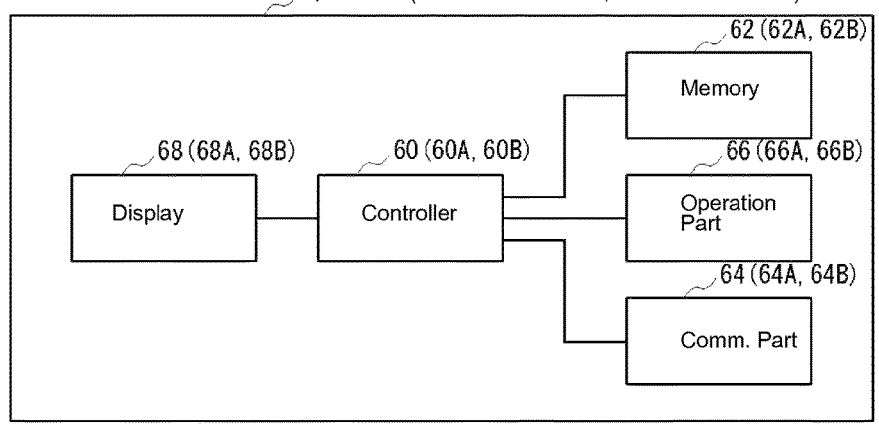
FIG. 3 illustrates a schematic diagram illustrating configurations of an administrator terminal and a user terminal.

As illustrated in FIG. 3, in the administrator terminal 4A, a controller 60A controls respective parts (a memory 62A, an operation part 66A, a communication part 64A and a display 68A). The controller 60A is configured to have a CPU (not illustrated in the drawings) as a core component and controls the respective parts to perform various processes by reading out a predetermined program from the memory 62A (which is formed by a ROM, a RAM, a hard disk drive, a flash memory and the like) and executing the program. In the user terminal 4B, similar to the administrator terminal 4A, a controller 60B controls respective parts (a memory 62B, an operation part 66B, a communication part 64B and a display 68B).

The communication part 64A performs data transmission to and data reception from the printer 2 and the user terminal 4B via the Internet NT. The memory 62A stores various print jobs. The controller 60 reads out a print job from the memory 62A, specifies a printer of a print destination and transmits the print job to the cloud print server 5.

The operation part 66 is configured by, for example, a keyboard and a mouse, and receives an operation instruction from an administrator. The display 68 is configure by, for example, a liquid crystal display, and displays image data, such as an apparatus web page of the printer 2, output from the controller 60.

[1-5. Description of Service State]

The printer 2 is set, according to an operation of an administrator, to be any one of three service states including a service enabled state, a service stopped state and a service disabled state, as a service state of the printer 2 in the cloud print system 1.

Figure 4:
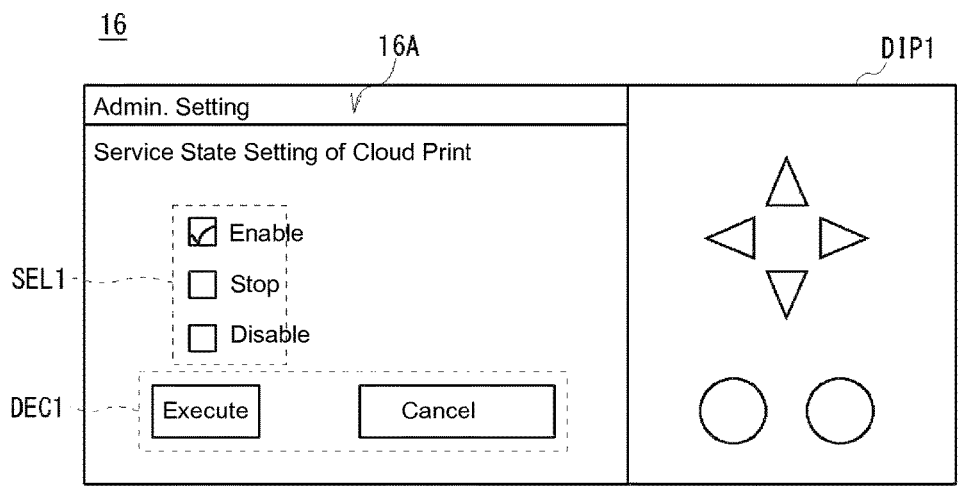
FIG. 4 illustrates a schematic diagram illustrating a service state setting screen of an operation panel.

The service state is configured to be changeable only by an administrator. Specifically, the controller 10 displays a service state setting screen DIP1 (illustrated in FIG. 4) in the operation panel 16A. In the service state setting screen DIP1, a selection part SEL1 and a determination part DEC1 are displayed, the selection part SEL1 allowing an administrator to select "enable," "stop" and "disable" as a service state and the determination part DEC1 allowing the setting of the selected service state to be executed or canceled.

The service state controller 24 sets, in the service state holding part 32, a selected service state when an operation instruction that selects a service state is received from the operation panel 16A by an operation of an administrator.

Figure 5:
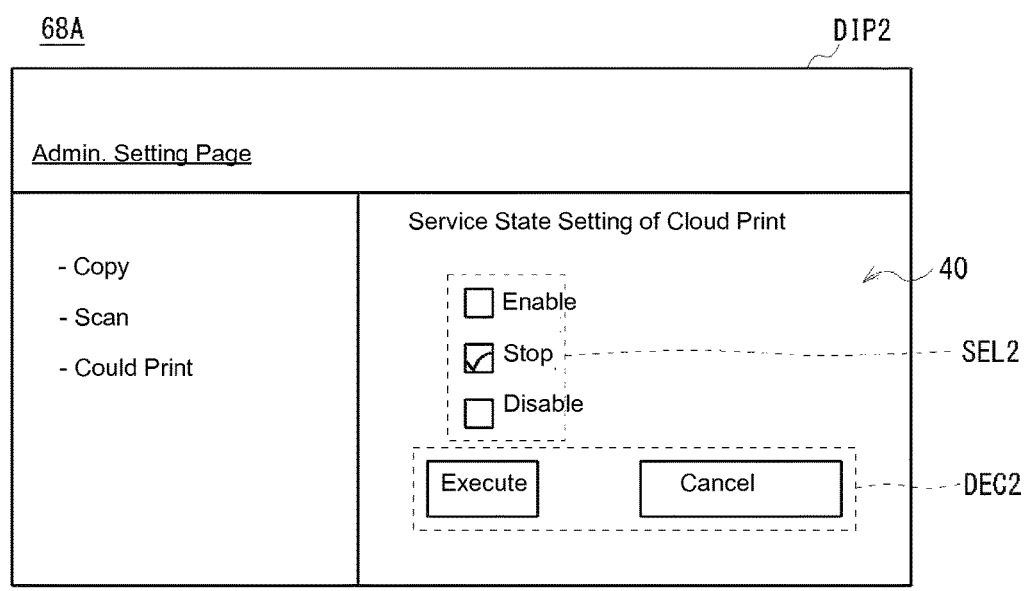
FIG. 5 illustrates a schematic diagram illustrating a service state setting screen of an apparatus web page.

Further, in the cloud print system 1, the service state is configured to be changeable not only by operating the operation panel 16A of the printer 2, but also via the administrator terminal 4A. Specifically, based on an operation of an administrator, the controller 60A of the administrator terminal 4A displays in the display 68A a service state setting screen DIP2 (illustrated in FIG. 5) that is received from the administrator disclosure part 36 of the printer 2 via the Internet NT. In the service state setting screen DIP2, a selection part SEL2 and a determination part DEC2 are displayed, the selection part SEL2 allowing an administrator to select "enable," "stop" and "disable" as a service state and the determination part DEC2 allowing the setting of the selected service state to be executed or canceled.

The service state controller 24 sets, in the service state holding part 32, a selected service state when an operation instruction that selects a service state is received from the administrator terminal 4A by an operation of an administrator.

As described above, in the cloud print system 1, the service state can be changed by an operation with respect to the operation panel 16A of the printer 2 or an operation with respect to the apparatus web page that is displayed in the display 68A of the administrator terminal 4A.

Here, the service enabled state indicates a state in which the printer 2 and the cloud print server 5 are constantly connected via the Internet NT and, when a print job is added to the cloud print server 5 from the client 4, a print job addition notification is transmitted from the cloud print server 5 via the Internet NT to the printer 2. Further, in the service enabled state, the above-described manual reception can be executed.

Further, the service stopped state indicates a state in which the printer 2 and the cloud print server 5 are not constantly connected via the Internet NT and, when a print job is added to the cloud print server 5 from the client 4, a print job addition notification is not transmitted from the cloud print server 5 to the printer 2 but the manual reception can be executed using the printer 2.

Further, the service disabled state indicates a state in which the printer 2 and the cloud print server 5 are not constantly connected via the Internet NT and, when a print job is added to the cloud print server 5 from the client 4, a print job addition notification is not transmitted from the cloud print server 5 to the printer 2 and the manual reception cannot be executed using the printer 2.

[1-6. Print Process Procedures]

In the following, print process procedures of the cloud print system 1 in each of the service enabled state, the service stopped state and the service disabled state are described. The printer 2 is assumed to have already been registered in the cloud printer list of the cloud print server 5.

[1-6-1. Print Process Procedures of Service Enabled State]

Print process procedures RT1 of the cloud print system 1 in the service enabled state are described using a sequence chart of FIG. 6.

At SP1, when power of the printer 2 is turned on, the controller 10 of the printer 2 transmits via the print job addition notification reception controller 20 a connection request to the cloud print server 5.

At SP2, when the connection request is received, the controller 50 of the cloud print server 5 transmits a connection response to the printer 2.

When the connection response is received, the controller 10 of the printer 2 causes the print job addition notification reception controller 20 and the controller 50 of the cloud print server 5 to be in a constantly connected state. In the processes of SP1 and SP2 and a process of SP4 (to be described later), for example, an XMPP (Extensible Messaging and Presence Protocol), which is an XML-based protocol, is used, and, in the constantly connected state, the printer 2 and the cloud print server 5 are connected via the XMPP.

Here, at SP3, by transmitting from the client 4 to the cloud print server 5 a print job with the printer 2 specified as a print destination, the print job is added to the print job queue of the printer 2 in the memory 52 of the cloud print server 5, and then, at SP4, the controller 50 of the cloud print server 5 transmits a print job addition notification to the printer 2.

At SP5, when the print job addition notification is received via the print job addition notification reception controller 20, the printer 2 transmits a print job list acquisition request via the print job reception controller 22 to the cloud print server 5.

At SP6, when the print job list acquisition request is received, the controller 50 of the cloud print server 5 transmits a print job list acquisition response to the printer 2. The print job list acquisition response contains a print job list JL illustrated in FIG. 7.

In the print job list JL, for each print job, a "job ID," a "file name," "status," a "print data storage destination" and a "print settings storage destination" are listed. The print job list JL is created for each printer registered with the cloud print server 5. In FIG. 7, two print jobs to be printed using the printer 2 are listed.

The "job ID" indicates unique identification information that is assigned to each print job, and the "file name" indicates a file name of the print data. The "status" indicates a current printing status of the print job and can be one of four kinds of states including "Waiting", "In Progress", "Error" and "Print Completed."

"Waiting" state indicates that the print job is stored in the memory 52 of the cloud print server 5 and has not been printed using the printer of the print destination. "In Progress" state indicates that the print job is in the middle of being transmitted from the cloud print server 5 to the printer of the print destination and being printed. The "Error" state indicates that, although the print job has been transmitted from the cloud print server 5 to the printer of the print destination, an error has occurred during printing. The "Print Completed" state indicates that the print job has been transmitted from the cloud print server 5 to the printer of the print destination and has been normally printed.

The "print data storage destination" indicates a URL (Uniform Resource Locator) of a storage destination of the print data in the print job queue of the memory 52. The "print setting values storage destination" indicates a URL of a storage destination of print setting values that indicate settings, such as sheet size and black-and-white or color, of when the print data is printed.

At SP7, when the print job list JL is received, the printer 2 transmits, via the print job reception controller 22, a print setting values acquisition request to the cloud print server 5.

At SP8, when the print setting values acquisition request is received, the controller 50 of the cloud print server 5 transmits print setting values to the print 2. The print 2 receives the print setting values.

When the print setting values acquisition response is received, the print job reception controller 22 of the printer 2 acquires print setting values from the URL that is indicated by the "print setting values storage destination" of the print job that is a current processing target in the print job list JL, and, at SP9, transmits a print data acquisition request to the cloud print server 5.

At SP10, when the print data acquisition request is received, the cloud print server 5 transmits print data to the printer 2. The printer 2 receives the print data.

When the print data acquisition response is received via the print job reception controller 22, the printer 2 acquires print data from the URL that is indicated by the "print data storage destination" of the print job that is the current processing target in the print job list JL, and, at SP11, via the print controller 18, prints the print data based on the print setting values.

When the print data is printed, the printer 2, at SP12, transmits, via the print job reception controller 22, a print completion notification to the cloud print server 5. The print completion notification notifies the cloud print server 5 of "Print Completed" when printing is normally completed and "Error" when an error has occurred.

When the print completion notification is received, the controller 50 of the cloud print server 5 changes the status of the print job that is the current processing target in the print job list JL to "Print Competed" or "Error." The controller 50 deletes from the memory 52 the print job of which the "status" has been changed to "Print Completed" or "Error" after a predetermined period of time.

The printer 2 and the cloud print server 5 print all print jobs to be printed using the current printer 2 by repeating the processes of SP7-SP11 for the number of print jobs, for which the "status" is "Waiting," among the print jobs listed in the current print job list M.

At SP3, SP5-SP10 and SP12, for example, HTTP (HyperText Transfer Protocol) is used.

As described above, the printer 2 acquires via the Internet NT a print job that is added by the client 4 via the Internet NT to the cloud print server 5 and performs printing of print data based on the print job.

[1-6-2. Print Process Procedures of Service Stopped State]

Next, print process procedures RT2 of the cloud print system 1 in the service stopped state are described using a sequence chart of FIG. 8. In the following, a case where the service state is changed from the service enabled state to the service stopped state is described. In the service enabled state, the print job addition notification reception controller 20 of the printer 2 and the controller 50 of the cloud print server 5 are in a constantly connected state.

At SP21, the printer 2 acquires via the service state controller 24 an operation instruction of changing the service state to the service stopped state, and sets the service stopped state in the service state holding part 32.

By performing a disconnection process at SP22, the controller 10 disconnects the connection of the constantly connected state between the print job addition notification reception controller 20 and the controller 50 of the cloud print server 5.

Here, at SP23, when a print job is added to the cloud print server 5 by transmitting the print job from the client 4 to the cloud print server 5 specifying the printer 2 as the print destination, since the cloud print server 5 and the printer 2 are in a state of not being constantly connected, at SP24, the controller 50 of the cloud print server 5 stores the print job in the print job queue of the printer 2 in the memory 52.

In the service stopped state, although the cloud print server 5 does not transmit a print job addition notification to the printer 2, in preparation for when a request to acquire the print job is received from the printer 2 thereafter, the cloud print server 5 stores the print job received from the client 4.

At SP25, the printer 2 acquires via the manual reception controller 28 a manual reception instruction, and then, at SP26, the printer 2 transmits via the print job reception controller 22 a print job list acquisition request to the cloud print server 5.

At SP26-SP33, the printer 2 and the cloud print server 5 perform processes that are the same as those of SP5-SP12 of the print process procedures RT1 (FIG. 6), and print, using the printer 2, the print jobs that are accumulated in the cloud print server 5 during the time period from when the service state is changed from the service enabled state to the service stopped state to when the manual reception is performed.

In this case, based on operations of a user, the printer 2 selects and receives print jobs that the user wants to print among the print jobs listed in the print job list JL, and performs printing.

As described above, in the service stopped state, when a print job is transmitted from the client 4 to the cloud print server 5, without transmitting a print job addition notification from the cloud print server 5 to the printer 2, the cloud print system 1 temporarily stores the print job in the cloud print server 5.

Subsequently, when a manual reception instruction is made with respect to the printer 2, by transmitting the print job that has been temporarily stored from the cloud print server 5 to the printer 2, the cloud print system 1 performs printing using the printer 2.

[1-6-3. Print Process Procedures of Service Disabled State]

Next, print process procedures RT3 of the cloud print system 1 in the service disabled state are described using a sequence chart of FIG. 9. In the following, a case where the service state is changed from the service enabled state to the service disabled state is described. In the service enabled state, the print job addition notification reception controller 20 and the cloud print server 5 are in a constantly connected state.

At SP41, the printer 2 acquires via the service state controller 24 an operation instruction of changing the service state to the service disabled state, and sets the service disabled state in the service state holding part 32.

By performing a disconnection process at SP42, the controller 10 disconnects the connection of the constantly connected state between the print job addition notification reception controller 20 and the controller 50 of the cloud print server 5.

Here, at SP43, when a print job is added to the cloud print server 5 by transmitting the print job from the client 4 to the cloud print server 5 specifying the printer 2 as the print destination, since the cloud print server 5 and the printer 2 are in a state of not being constantly connected, at SP44, the controller 50 of the cloud print server 5 stores the print job in the print job queue of the printer 2 in the memory 52.

In the service disabled state, a print job addition notification is not transmitted from the cloud print server 5 to the printer 2 and the manual reception is in a not executable state. Therefore, the cloud print system 1 cannot perform printing using the printer 2 that uses the cloud print server 5. Therefore, in the service disabled state, in the case where a print job that is added to the cloud print server 5 is printed using the printer 2, it is necessary for the printer 2 to change the service state to the service enabled state, or to change the service state to the service stopped state and then execute the manual reception.

When the service state is changed from the service disabled state to the service enabled state, the cloud print server 5 transmits a print job addition notification to the printer 2. Thereby, the printer 2 and the cloud print server 5 perform processes that are the same as those of SP5-SP12 of the print process procedures RT1, and print jobs that are accumulated in the cloud print server 5 during the period of time of the service disabled state are printed using the printer 2.

[1-7. Effects]

In the above configuration, in the cloud print system 1, in addition to the service enabled state and the service disabled state, a state as the service stopped state is provided in which, when the printer 2 and the cloud print server 5 are not constantly connected via the Internet NT and a print job is added from the client 4 to the cloud print server 5, although a print job addition notification is not transmitted from the cloud print server 5 to the printer 2, the manual reception can be executed.

As a result, even when a print job addition notification is not received from the cloud print server 5, by an operation of a user, the printer 2 can confirm whether or not a print job is stored in the cloud print server 5 and, at a desired timing of the user, receive the print job from the cloud print server 5 and print the print job.

Conventionally, in the service disabled state, when print jobs accumulated in the cloud print server 5 are printed, it is necessary to temporarily change the service state to the service enabled state to receive the print jobs and thereafter to again change the service state to the service disabled state, and this forces complicated and troublesome work on a user.

In contrast, in the cloud print system 1 according to the present embodiment, by setting the service state to the service stopped state, a print job addition notification can be prevented from being transmitted from the cloud print server 5 to the printer 2, and a user desired print job can be received and printed by performing only the manual reception without changing the service state.

According to the above configuration, the cloud print system 1 includes the printer 2 and the cloud print server 5. The printer 2 is provided with the print job addition notification reception controller 20 that receives from the cloud print server 5 a print job addition notification indicating that a print job is added to the cloud print server 5; the print job reception controller 22 that transmits a print setting values acquisition request and a print data acquisition request, as a print job acquisition request, to the cloud print server 5, and acquires the print job from the cloud print server 5; the print controller 18 that performs printing based on the print job acquired from the cloud print server 5; and the service state controller 24 that sets the service state to any one of the service enabled state, in which a print job addition notification is received and a print job is acquired from the cloud print server 5, and the service stopped state, in which the print job addition notification is not received and the print job is acquired from the cloud print server 5 based on an operation of a user. The cloud print server 5 is provided with the memory 52 that stores a print job received from the client 4; and the controller 50 that when a print job is received from the client 4, in the case of the service enabled state, transmits a print job addition notification to the printer 2, receives a print job acquisition request from the printer 2 and transmits the print job, and, in the case of the service stopped state, without transmitting a print job addition notification to the printer 2, transmits the print job when a print job acquisition request is received from the printer 2.

As a result, in the cloud print system 1, in the state in which the printer 2 is not notified of the addition of a print job to the cloud print server 5, at a user desired timing, presence or absence of a print job in the cloud print server 5 can be confirmed from the printer 2 and the printer 2 can acquire the print job from the cloud print server 5 and perform printing.

Second Embodiment

In the following, a second embodiment is described.

A feature of this embodiment is that, in the above service stopped state, when manually requesting a print job from the cloud print server 5, the print job is selectively requested. Specifically, when a plurality of print jobs are stored in the cloud print server 5, instead of sending a print job that is stored earlier, a print job that is stored later is requested before other print jobs. Alternatively, by requesting an order in which a plurality of print jobs are printed, printing is performed based on the print order. Usually, print jobs are printed in an order of from older print jobs to newer print jobs. In contrast, in the present embodiment, when a user select "from newer to older" as a print order, printing is performed in the order from newly stored print jobs to older print jobs.

FIG. 10 illustrates an excerpt of print process procedures of the above second embodiment. In FIG. 10, between SP26 and SP28 of the printer 2, in a print process of a hibernate state that is illustrated in FIG. 8, a process (SP26-2) that determines a print order is added.

Figure 11A:
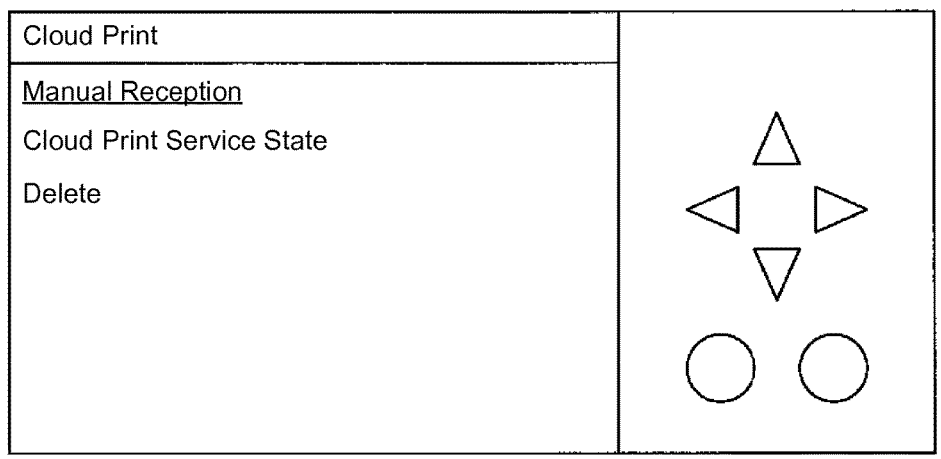
FIG. 11A illustrates an example of a cloud print menu that is displayed on a panel.
Figure 11B:
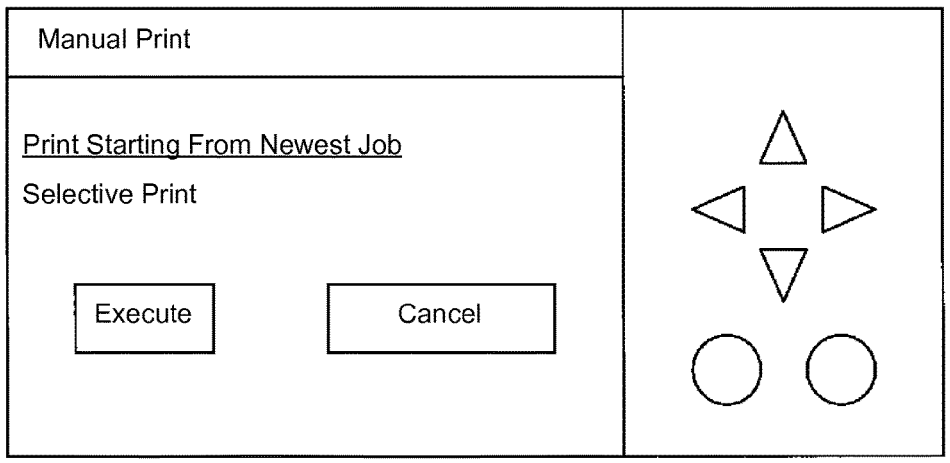
FIG. 11B illustrates an example of a manual print menu that is displayed on the panel.

In the following, a process that selects a print order is described. A controller 10 of the printer 2 displays a screen illustrated in FIG. 11A in the operation panel 16A. When an operator selects "Manual Reception," the controller 10 displays a screen illustrated in FIG. 11B in the operation panel 16A. When the operator selects "Print staring from Newest Job," the service state controller 24 acquires this selection instruction operation from the panel 16A. Then, the service state holding part holds this selection. From information in an acquired print job list as illustrated in FIG. 12 and with reference to information of times at which print jobs are added to the cloud print server 5, the manual reception controller 28 determines a print order such that printing is performed starting from a newest print (SP26-2).

For example, in the print job list illustrated in FIG. 13, "update time" is time since a print job is added to the cloud print server 5. The "update time" is expressed using a numerical value. A small numerical value means that the print job has been stored for a long time; and a large numerical value means that the print job is newly stored. In the case where the print order is to start printing from the newest print job, it is determined that the print job for which the above update time is the largest is first processed, and thereafter, print jobs are processed in a descending order of the update time.

Figure 12:
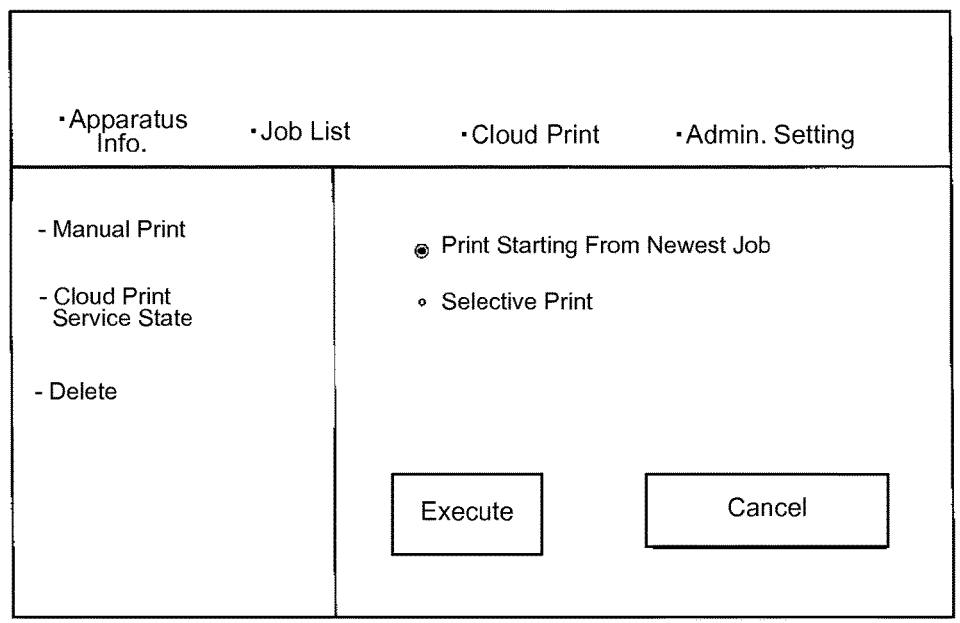
FIG. 12 illustrates an example of a manual print page from an apparatus web page.
Figure 14A:
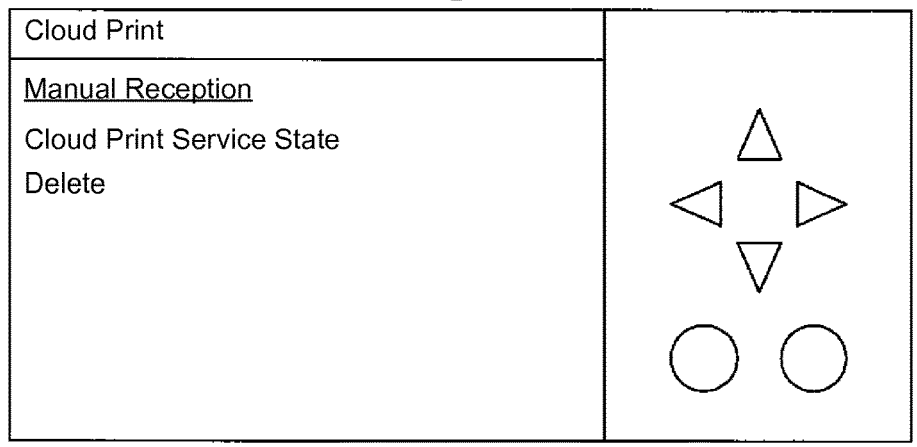
FIG. 14A illustrates an example of the cloud print menu on the panel.
Figure 14B:
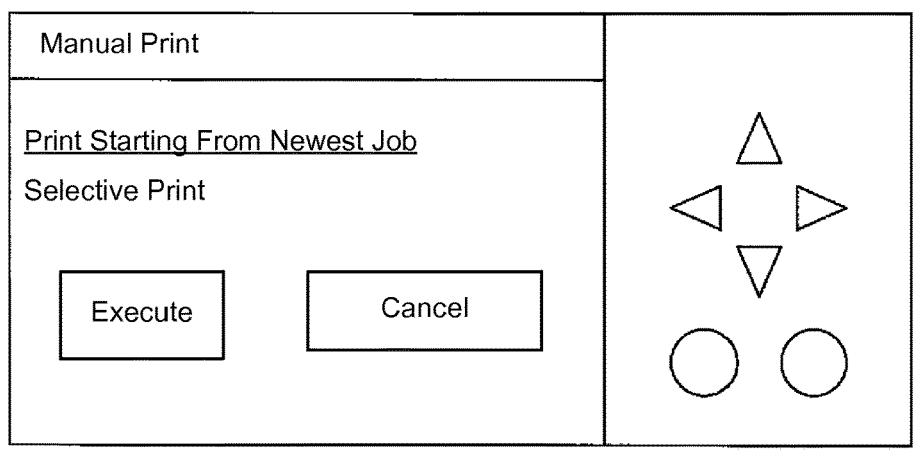
FIG. 14B illustrates an example of the manual print menu on the panel.
Figure 14C:
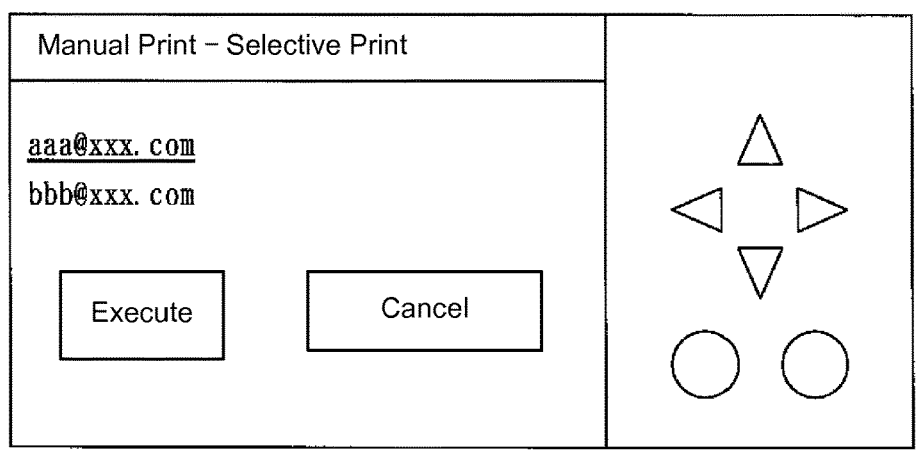
FIG. 14C illustrates an example of a user information display screen during selective printing.
Figure 15A:
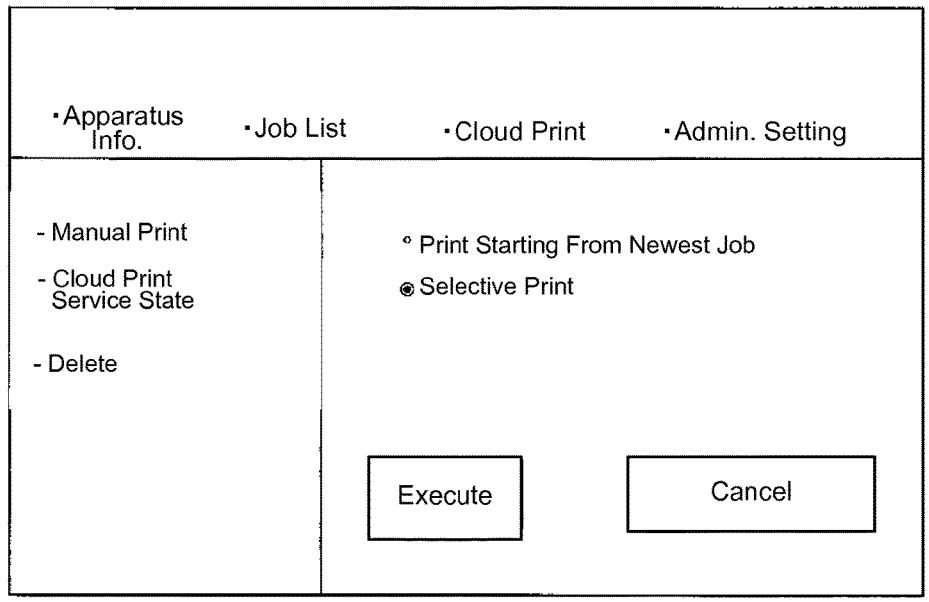
FIG. 15A illustrates an example of a display screen of the manual print menu.
Figure 15B:
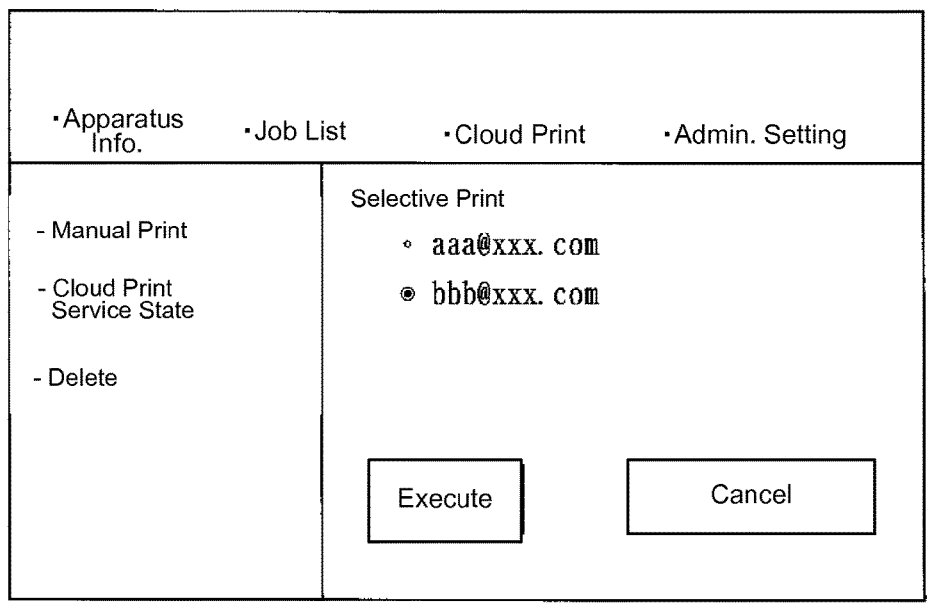
FIG. 15B illustrates an example of a user display screen during selective printing.

FIG. 12 illustrates an example of a manual print page. As a state change of the printer 2, separate from the above embodiment, as illustrated in FIG. 13, it is also possible to allow the state to be changed via the administrator terminal 4A. Print control of the manual reception allows print jobs to be printed for each user who has registered with the cloud print server 5. The manual reception controller 28 extracts, from information contained in an acquired print job list as illustrated in FIG. 12, user information for whom a print job is registered in the cloud print server 5. Then, as illustrated in FIGS. 14A-14C, the manual reception controller 28 displays an extracted user information list in the operation panel 16A and displays a screen allowing an operator to make a selection. In addition to the present example, as illustrated in FIGS. 15A and 15B, it is also possible to allow the state to be changed via the administrator terminal 4A. As an example of selective printing, FIG. 15B illustrates mail addresses of users. When a mail address is selected, only print jobs related to the selected mail address are selected and are print-processed.

2. Other Embodiments

In the above-described embodiment, the case is described where the service state is switched by an operation of a user with respect to the operation panel 16A or an operation with respect to the administrator disclosure part 36 of the apparatus web page of the printer 2 via the administrator terminal 4A. The present invention is not limited to this. It is also possible to automatically switch the service state according to various situations such as a time slot. In this case, for example, when the service state is automatically switched to the service enabled state during the day and to the service stopped state during the night, generation of sound during the night can be suppressed by not automatically performing printing using the printer, and, in a case where there is a print job that a user wants to print even when sound is generated during the night, printing can be performed according to the intention of the user. Further, for example, in a case where the printer 2 is directly connected to a predetermined terminal by a LAN (Local Area Network) cable or the like other than the Internet NT, when the service state is automatically switched to the service stopped state during the day and to the service enabled state during the night, during the day, by printing only print jobs from the predetermined terminal, the printer 2 can be exclusively used by the predetermined terminal, and, during the night, print jobs from other terminals connected via the Internet NT can also be printed. On the other hand, as described above, when the switching of the service state is performed based on an operation of a user, the intention of the user can be reflected and the switching of the service state can be performed at a timing the user desires.

Further, in the above-described embodiment, the case is described where, in the service stopped state, print jobs that a user wants to print among the print jobs listed in the print job list JL are selected to receive and print. The present invention is not limited to this. In the service stopped state, it is also possible to collectively print all print jobs listed in the print job list JL.

Further, in the above-described embodiment, the case is described where, in the service enabled state, the manual reception is possible. However, the present invention is not limited to this. In the service enabled state, it is also possible for the manual reception to be not executable.

Further, in the above-described embodiment, the case is described where one printer is connected to the Internet NT. The present invention is not limited to this. It is also possible that a predetermined number of two or more printers are connected to the Internet NT. In this case, with respect to the plurality of the printers, a unique printer ID is issued for each one printer and is registered in the cloud printer list in the memory 52 of the cloud print server 5.

Further, in the above-described embodiment, the case is described where, when a print job is added from the client 4 to the cloud print server 5, the cloud print server 5 transmits a print job addition notification to the printer 2. The present invention is not limited to this. It is also possible that an apparatus other than the cloud print server 5 transmits a print job addition notification to the printer 2.

Further, in the above-described embodiment, the case is described where, as the clients 4, one administrator terminal 4A and one user terminal 4B are connected to the Internet NT. The present invention is not limited to this. It is also possible that a predetermined number of clients are connected to the Internet NT.

Further, in the above-described embodiment, the case is described where the administrator terminal 4A and the user terminal 4B are different terminals. The present invention is not limited to this. It is also possible that the administrator terminal 4A and the user terminal 4B are the same terminal. In this case, when a user operates a terminal, the user disclosure part 34 may be displayed on the display of the terminal, and on the other hand, when an administrator operates the terminal, the administrator disclosure part 36 may be displayed on the display of the terminal.

Further, in the above-described embodiment, the case is described where, when power of the printer 2 is turned on, at SP1 of the print process procedures RT1, a connection request is transmitted to the cloud print server 5. The present invention is not limited to this. It is also possible that a connection request is transmitted to the cloud print server 5 at various timings such as immediately after the printer ID of the printer 2 is registered in the cloud printer list in the memory 52 of the cloud print server 5.

Further, in the above-described embodiment, the case is described where a print data acquisition response is transmitted from the cloud print server 5 to the printer 2 after a print setting values acquisition response is transmitted. The present invention is not limited to this. It is also possible that the print setting values acquisition response is transmitted to the printer 2 after the print data acquisition response is transmitted.

Further, in the above-described embodiment, the case is described where HTTP is used at SP3, SP5-SP10 and SP12 of the print process procedures RT1. The present invention is not limited to this. Various protocols such as HTTPS (HyperText Transfer Protocol Secure) may be used.

Further, in the above-described embodiment, the case is described where the printer 2, the user terminal 4B, the administrator terminal 4A and the cloud print server 5 are connected via the Internet NT. The present invention is not limited to this. The printer 2, the user terminal 4B, the administrator terminal 4A and the cloud print server 5 may be connected via various communication means such as USB cables and wired and wireless LANs that are in compliance with standards such as IEEE (Institute of Electrical and Electronics Engineers) 802.3u/ab and IEEE802.11a/b/g/n.

Further, in the above-described embodiment, the case is described where the present invention is applied to the cloud print system 1 in which a print job that is transmitted from the client 4 via the Internet NT to the cloud print server 5 is printed using the printer 2. The present invention is not limited to this. The present invention may also be applied to a system in which various content data transmitted from the client 4 via the Internet NT to a server is downloaded using a predetermined device.

Further, in the above-described embodiment, the case is described where the present invention is applied to a printer. The present invention is not limited to this. The present invention may be applied to various devices such as a copy machine, a multifunction machine, and a FAX machine.

Further, in the above-described embodiment, the case is described where the printer 2 as an image forming apparatus is configured by the print job addition notification reception controller 20 as a print job addition notification reception controller, the print job reception controller 22 as a print job reception controller, the print controller 18 as a print controller, and the service state controller 24 as a service state controller. The present invention is not limited to this. The image forming apparatus may also be configure by a print job addition notification reception controller, a print job reception controller, a print controller and a service state controller that are provided with various other configurations.

Further, in the above-described embodiment, the case is described where the cloud print system 1 as an image forming system is configured by the printer 2 as an image forming apparatus and the cloud print server 5 as a server, the printer 2 being provided with the print job addition notification reception controller 20 as a print job addition notification reception controller, the print job reception controller 22 as a print job reception controller, the print controller 18 as a print controller and the service state controller 24 as a service state controller, and the cloud print server 5 being provided with the memory 52 as a memory and the controller 50 as a controller. The present invention is not limited to this. The image forming system may also be configure by an image forming apparatus and a server, the image forming apparatus being provided with a print job addition notification reception controller, a print job reception controller, a print controller and a service state controller that are provided with various other configurations, and the server being provided with a memory and a controller that are provided with various other configurations.

In addition to a computer that causes a printer to print an image, the present invention can also be applied various electronic devices that perform various processes related images such as an image scanner, a facsimile machine, or a copying machine.

What is claimed is:

1. An image forming system comprising:
   an image forming apparatus; and
   a server in which the image forming apparatus has been registered, the server being connected to the image forming apparatus via a network,
   the registered image forming apparatus comprising:
      a processor; and
      a memory that contains a computer executable program; and
      a communication part that is configured to selectively switch a communication state to communicate or to disconnect a communication under a predetermined protocol between the registered image forming apparatus and the server based on an operation mode, wherein
      when the program is executed, the program causes the processor to function as:
         a print job addition notification reception controller that receives from the server a print job addition notification that indicates that a print job is added to the server;
         a print job reception controller that transmits a print job acquisition request to the server and acquires the print job from the server;
         a print controller that performs printing based on the print job that is acquired from the server; and
         a service state controller that selectively operates in different operation modes including a service enabled mode, in which the registered image forming apparatus operates to accept the print job addition notification transmitted from the server and to transmit the print job acquisition request to the server to acquire the print job from the server, and a service stopped mode, in which the registered image forming apparatus operates to transmit the print job acquisition request to the server based on an operation of a user to acquire the print job from the server, without receiving the print job addition notification from the server,
   in the service enabled mode, the processor causes the communication part to maintain a constant communication with the server under the predetermined protocol, and
   in the service stopped mode, upon setting the service stopped mode, the processor causes the communication part to execute a disconnection process to terminate the communication under the predetermined protocol between the registered image forming apparatus and the server and establishes the communication with the server under the predetermined protocol only when a request for acquiring the print job from the server is made by the operation of the user, and
   the server comprising:
      a memory that stores information of the registered image forming apparatus and the print job for the registered image forming apparatus received from a client;
      a controller; and
      a communication part that is configured to communicate with the registered image forming apparatus under the predetermined protocol, wherein
   in the case of the service enabled mode, the controller transmits the print job addition notification to the registered image forming apparatus for which the print job is received from the client, receives the print job acquisition request from the registered image forming apparatus, and transmits the print job to the registered image forming apparatus, in the constant communication with the registered image forming apparatus under the predetermined protocol, and,
   in the case of the service stopped mode, without transmitting the print job addition notification to the registered image forming apparatus, the controller transmits the print job to the registered image forming apparatus when the communication with the registered image forming apparatus under the predetermined protocol is established and the print job acquisition request is received from the registered image forming apparatus.

2. The image forming system according to claim 1, wherein
   the print controller of the registered image forming apparatus has a function of prompting the user to input a print order and a function of transmitting the input print order to the server, and
   the server determines, based on the print order transmitted from the registered image forming apparatus, a sequence of print jobs that are stored, creates a print job list based on the determined sequence, and transmits the print job list to the registered image forming apparatus.

3. The image forming system according to claim 2, wherein
   the print order is a reverse time series, in which a print job that is more newly updated is placed higher in the print job list.

4. The image forming system according to claim 2, wherein
   the print order is such that only print jobs related to a selected user are arranged in the print job list.

5. The image forming system according to claim 1, wherein
   the predetermined protocol is XMPP.

6. The image forming system according to claim 1, wherein the different operation modes include a service disabled mode, in which the registered image forming apparatus operates to not accept the print job addition notification transmitted from the server and to not acquire the print job from the server based on the operation of the user.

7. The image forming system according to claim 1, wherein
the different operation modes include a service disabled mode, in which the registered image forming apparatus operates to not accept the print job addition notification transmitted from the server and to not acquire the print job from the server based on the operation of the user.

8. The image forming system according to claim 1, wherein
the service state controller sets one of the different operation modes based on the operation of the user.

9. The image forming system according to claim 1, wherein
the service state controller automatically sets one of the different operation modes according to a situation regardless of an operation of a user.

10. The image forming system according to claim 1, wherein
the service state controller switches the service state according to a time slot.

11. The image forming system according to claim 1, wherein
in the service enabled mode, the print job is acquired from the server based on the operation of the user.

12. The image forming system according to claim 1, wherein
in the service enabled mode, the print job is not acquired from the server based on an operation of a user.

13. The image forming system according to claim 1, wherein
in the service enabled mode, when a printer is newly registered at the server, the service state controller of the newly registered printer establishes the communication between the server and the newly registered printer so as to establish the constant communication under the predetermined protocol with the server.

14. A method for selective image formation, comprising:
registering an image forming apparatus at a server;
receiving, by the server, a print job from a user terminal for the registered image forming apparatus;
switching a communication state to communicate or to disconnect a communication between the registered image forming apparatus and the server under a predetermined protocol based on operation modes, the operation modes including:
a service enabled mode, in which the registered image forming apparatus maintains a constant communication with the server under the predetermined protocol, transmits a print job acquisition request to the server in response to a print job addition notification received from the server, and receives the print job from the server that is transmitted in response to the print job acquisition request; and
a service stopped mode, in which the registered image forming apparatus disconnects a communication with the server when the service stopped mode is set, transmits the print job acquisition request to the server based on an operation of a user without receiving the print job addition notification from the server, and receives the print job from the server that is transmitted in response to the print job acquisition request;
under the service enabled mode, maintaining the constant communication between the server and the registered image forming apparatus under a predetermined protocol, transmitting the print job acquisition request from the registered image forming apparatus to the server, and receiving the print job from the server;
under the service stopped mode, upon setting the service stopped mode, executing, by the registered image forming apparatus, a disconnection process to terminate the communication between the server and the registered image forming apparatus under the predetermined protocol, receiving a request for acquiring the print job from the server made by the user, establishing the communication between the server and the registered image forming apparatus under the predetermined protocol only when the request for acquiring the print job is received, receiving the print job from the server that is transmitted in response to a request for acquiring the print job; and
performing a print process based on the received print job.

15. The method according to claim 14, further comprising
prompting the user to input a print order;
transmitting the input print order from the registered image forming apparatus to the server;
determining, by the server, based on the print order transmitted from the registered image forming apparatus, a sequence of print jobs that are stored at the server;
creating a print job list based on the determined sequence; and
transmitting the print job list to the registered image forming apparatus.

16. The method according to claim 15, wherein
the user is prompted to input the print order that is a reverse time series, in which a print job that is more newly updated is placed higher in the print job list.

17. The method according to claim 15, wherein
the user is prompted to input the print order in which only print jobs related to a selected user are arranged in the print job list.

18. The method for selective image formation according to claim 14, wherein the server and the registered image forming apparatus communicate with each other under XMPP.

19. The method for selective image formation according to claim 14, wherein the different operation modes include a service disabled mode, in which the registered image forming apparatus operates to not accept the print job addition notification transmitted from the server and to not acquire the print job from the server based on the operation of the user, and
the method further comprises:
under the service disabled mode, disconnecting the communication between the server and the registered image forming apparatus under the predetermined protocol.

20. The method according to claim 14, wherein
in the service enabled mode, the constant communication is established between the server and a newly registered printer when the newly registered printer is registered at the server.

* * * * *